Nov. 8, 1932.  A. L. SAEKS  1,886,429
DEODORANT AND MOTH PREVENTATIVE
Filed May 19, 1930
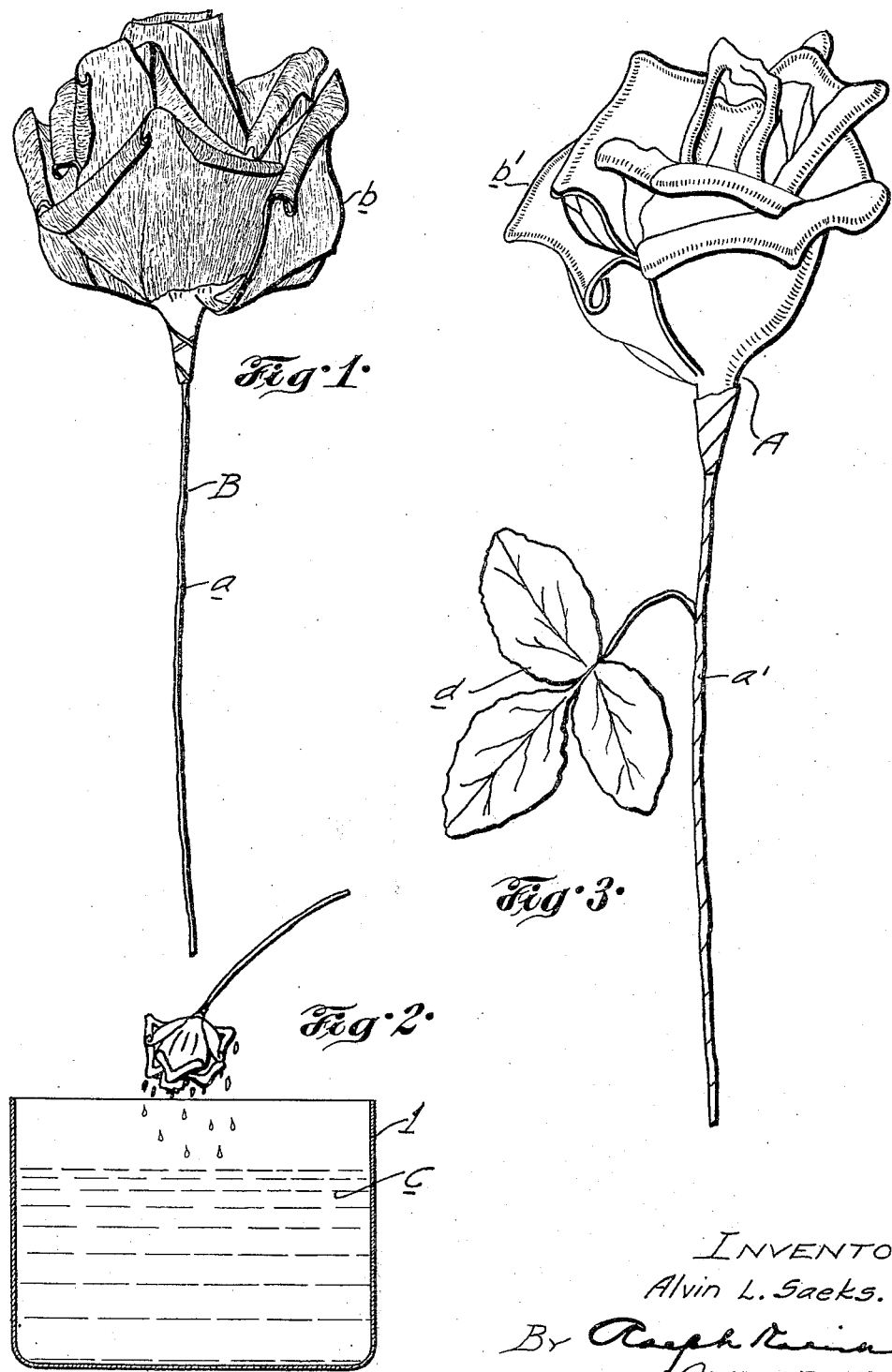
INVENTOR
Alvin L. Saeks.
By Ralph Kevin
ATTORNEY Patented Nov. 8, 1932

1,886,429

UNITED STATES PATENT OFFICE

ALVIN L. SAEKS, OF ST. LOUIS, MISSOURI, ASSIGNOR TO PURO CO., INC., OF ST. LOUIS, MISSOURI, A CORPORATION OF MISSOURI

DEODORANT AND MOTH-PREVENTATIVE

Application filed May 19, 1930. Serial No. 453,809.

This invention relates to a certain new and useful improvement in deodorants and moth-preventatives and has for its object the provision, as a new article of manufacture, of an efficient deodorant and moth-preventative artistically having the form and appearance of an artificial flower.

And with the above and other objects in view, my invention resides in the unique form and construction of the deodorant and moth-preventative as hereinafter described and pointed out in the claim.

In the accompanying drawing,—

Figure 1 illustrates in elevation the base of the finished deodorant and moth-preventative of my invention, such base being in the form of an artificial flower of papier-mâché or the like;

Figure 2 illustrates a step in the production of the finished deodorant and moth-preventative; and Figure 3 illustrates in elevation the finished deodorant and moth-preventative of my invention.

Referring now more in detail and by reference characters to the drawing, which illustrates a preferred embodiment of my invention, the finished deodorant or moth-preventative A of my invention, illustrated in Figure 3, has at its base an artificial flower B, such as shown in Figure 1, which latter preferably is constructed of papier-mâché or other suitable material in simulation of the rose, and of which $a$ is the stem and $b$ the flower proper.

Naphthalene, as is well known, is an efficient deodorant and moth-preventative and, having such properties and for such purpose, is utilized in the production, and as a component part, of my new deodorant and moth-preventative A. Accordingly, in the production of the deodorant and moth-preventative A, the naphthalene is suitably reduced to fluid form and, as at $c$, disposed in a vat 1, where the fluid naphthalene $c$ is suitably mixed with a small quantity, approximately four per cent, of any suitable perfuming and coloring matter, so that the finished deodorant and moth-preventative may possess a corresponding rose color, as well as also largely a corresponding rose odor.

The deodorizing and moth preventing composition being so provided, the artificial flower $b$ of the base B is then dipped in the fluid composition described and duly withdrawn, a certain amount of the composition adhering to the withdrawn flower $b$. Such coating of the composition on the withdrawn base B or more or less quickly drys and hardens, and in like manner the base B is repeatedly dipped in the vat and coated with said composition until the adhering composition has been built up upon the flower-base $b$ to the thickness desired in the finished flower or bulb $b'$ of the finished deodorant and moth-preventative A. Preferably, to obtain the best results and a smooth surface finish in the flower $b'$, the temperature of the fluid composition $c$ should be maintained at the temperature of approximately 78° C. and the base $b$ should be permitted to thoroughly dry and harden after each dipping and coating.

The artificial flower $b'$ of deodorant and moth-preventing characteristics having been so built up, the stem $a'$ thereof is neatly wrapped with any suitable material of green color and equipped with a leaf $d$, so that the finished deodorant and moth-preventative A simulates, as shown, closely indeed the form and appearance of a natural rose and possesses not only deodorant and moth preventative properties, but also the odor and color of a natural rose.

The article A of manufacture and commerce is thus completed and may be employed in vases or the like in a home both for beautifying purposes, as well as for its primary purpose, that of a deodorant and moth preventative.

Having thus described my invention, what I claim and desire to secure by Letters Patent is:

An artificial flower simulating a stemmed rose in form, contour, color, and appearance, the same comprising a flexible metallic stem, a papier-mâché base mounted on the stem and having the petal formation of a rose, a fabric-wrapping of green color on the stem, and a coating of naphthalene adheringly applied on and over the base, said coating being of a color for correspondingly imparting the desired rose color and appearance to the base.

In testimony whereof, I have signed my name to this specification.

ALVIN L. SAEKS.